United States Patent
Anderson

(10) Patent No.: US 8,312,514 B2
(45) Date of Patent: Nov. 13, 2012

(54) DEVICE OWNERSHIP TRANSFER FROM A NETWORK

(75) Inventor: Eric C. Anderson, San Jose, CA (US)

(73) Assignee: Scenera Technologies, LLC, Portsmouth, NH (US)

( * ) Notice: Subject to any disclaimer, the term of this patent is extended or adjusted under 35 U.S.C. 154(b) by 73 days.

(21) Appl. No.: 12/897,182

(22) Filed: Oct. 4, 2010

(65) Prior Publication Data

US 2011/0023100 A1   Jan. 27, 2011

Related U.S. Application Data

(62) Division of application No. 12/409,775, filed on Mar. 24, 2009, now Pat. No. 7,832,000, which is a division of application No. 10/872,739, filed on Jun. 21, 2004, now Pat. No. 7,530,098.

(51) Int. Cl.
*H04L 29/06* (2006.01)

(52) U.S. Cl. ............ 726/3; 726/4; 726/5; 726/7; 726/34

(58) Field of Classification Search .................. None
See application file for complete search history.

(56) References Cited

U.S. PATENT DOCUMENTS

| | | | |
|---|---|---|---|
| 6,665,529 B1 * | 12/2003 | Mills, Jr. ....................... | 455/411 |
| 6,782,251 B2 * | 8/2004 | Kagay, Jr. ..................... | 455/410 |
| 6,859,651 B2 | 2/2005 | Gabor | |
| 6,980,660 B1 | 12/2005 | Hind et al. | |
| 7,031,705 B2 * | 4/2006 | Grootwassink ............ | 455/432.1 |
| 7,149,521 B2 | 12/2006 | Sundar et al. | |
| 7,215,943 B2 * | 5/2007 | Verma et al. .................. | 455/410 |
| 7,277,547 B1 | 10/2007 | Delker et al. | |
| 7,289,631 B2 | 10/2007 | Ishidoshiro | |
| 7,548,981 B1 * | 6/2009 | Taylor et al. .................. | 709/227 |
| 2002/0061748 A1 | 5/2002 | Nakakita et al. | |
| 2003/0186681 A1 | 10/2003 | Gabor | |
| 2005/0245233 A1 | 11/2005 | Anderson | |
| 2007/0033287 A1 | 2/2007 | Kiyose et al. | |

OTHER PUBLICATIONS

Gehrmann, C., Bluetooth Security White Paper, Bluetooth SIG, Apr. 2002, Revision 1.0, pp. 10 and 14-15.

Held, "Overcoming Wireless LAN Security Vulnerabilities," [online] Information Systems Security, Jul./Aug. 2002 [retrieved on Dec. 23, 2008] Retrieved from the Internet: <URL: htpp://www.auerback-publications.com/ejournals/articles/article.asp?id=37896>, pp. 22-27.

* cited by examiner

Primary Examiner — Minh Dinh

(57) ABSTRACT

A home relationship is established between a device and a network by storing an ownership record in the device that identifies the network, and storing in the network a device identifier that identifies the device. Thereafter, communication is established between the device and the network. The ownership record is then transmitted from the network to the device, and automatic access to the device is granted to the network once the device verifies the transmitted ownership record against the ownership record stored in the device. In addition, the device identifier is transmitted from the device to the network, and automatic access to the network is granted to the device once the network verifies the transmitted device identifier against the device identifier stored in the network.

8 Claims, 6 Drawing Sheets

DEVICE OWNERSHIP TRANSFER FROM A NETWORK

CROSS-REFERENCE TO RELATED APPLICATIONS

The present application is a divisional of co-pending U.S. patent application Ser. No. 12/409,775, entitled, "Device Ownership Transfer From A Network" filed Mar. 24, 2009, which is a divisional of U.S. patent application Ser. No. 10/872,739, entitled "Device Ownership Transfer From a Network" filed on Jun. 21, 2004 (now U.S. Pat. No. 7,530,098 issued May 5, 2009,) both of which are commonly owned with this application, the entire disclosures of which are here incorporated by reference.

FIELD OF THE INVENTION

The present invention relates to computer networks, and more particularly to a method and system for establishing a home relationship between a mobile device and a network, and for transferring ownership information from the network to the device.

BACKGROUND OF THE INVENTION

A wireless LAN is a local area network that transmits over the air. Typically, one or more wireless base stations, which are also referred to as access points, are wired to an Ethernet network, while wireless adapters are either built into or attached to client devices. The access points and the wireless devices communicate via radio frequency over an area of several hundred feet through walls and other barriers. If there are multiple access points as in a corporation, for example, then roaming devices can be handed-off from one access point to another. One example of a wireless LAN standard today is 802.11.

For short distances between two devices, a wireless personal area network (PAN) may be used, such as Bluetooth. Bluetooth is an open standard for short-range transmission of digital voice and data between local devices, such as laptops, PDAs, imaging devices, phones, and desktop devices. Bluetooth supports point-to-point and multi-point applications, and has a range of 10 meters up to 100 meters with a power boost. Infrared transmission (IrDA) may also be used for very short distances between two devices, however, IrDA requires line of site between the two devices, while Bluetooth uses non-directional radio waves that can transmit through walls and other barriers.

One application for a wireless LAN is in the home for connecting two or more computers/devices. A home LAN is often the same Ethernet network found in companies, except that the home network is typically configured as one network, whereas a company may have many subnetworks for traffic and security purposes.

Not only is the number of wireless mobile devices being introduced to the market steadily increasing, but the types of devices equipped with wireless technology is also growing. For example, Bluetooth-enabled camcorders are now available. Currently, each wireless device, such as a camcorder or digital camera, is designed to work with any device connected to it that has appropriate connectivity, such as software and/or hardware drivers. Devices can be removed from a location, and moved to another location, and be set up to operate with no regard to device ownership. However, there is no knowledge or concept of an "owner" within a device. Thus, device theft is highly profitable, with little or no barrier to full use of a device by the new "owner." Electronic devices are widely available on the black market in the form of stolen goods. There is no operational mechanism to prevent full use by non-owners.

Accordingly, there is a need for a method and system for implementing and transferring device ownership in network devices in a manner that provides a barrier to device theft. The present invention addresses such a need.

SUMMARY OF THE INVENTION

The present invention provides a method and system for device ownership transfer. A home relationship is established between a device and a network by storing an ownership record in the device that identifies the network, and storing in the network a device identifier that identifies the device. Thereafter, communication is established between the device and the network. The ownership record is then transmitted from the network to the device, and automatic access to the device is granted to the network once the device verifies the transmitted ownership record against the ownership record stored in the device. In addition, the device identifier is transmitted from the device to the network, and automatic access to the network is granted to the device once the network verifies the transmitted device identifier against the device identifier stored in the network.

According to the method and system disclosed herein, once a "home" relationship is established between the device and the network, a secure connection is established, and is used to pass identifying information between the device and the network. Preferably, the identifying information contains a value that changes over time to ensure that the acknowledge message is always different. In further aspects of the present invention, the device can be set to cease functioning until a request/acknowledge cycle is completed. The request/acknowledge cycle would use the same secure connection, and also changes over time. Then when the device is connected to a foreign network, which is connected to the internet, the device imitates the transaction with its home network. If the device has been stolen, the home network can return a negative acknowledgement, causing the device to cease functioning, and remain in that state until direct communication is re-established with the home network.

DETAILED DESCRIPTION OF THE INVENTION

The present invention relates to establishing a home relationship between a wireless mobile device and to transferring ownership information to the device from the home network. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

In a first aspect of the present invention, a network protocol is provided that enables the establishment of a home relationship between a wireless device and a network server in a wireless network, such that no additional configuration is required by the user for the device to communicate over the network once the relationship has been established. In addition, no password, ID, or security key is required to be entered into the device to establish the connection. In a second aspect of the present invention, a method for transferring ownership information to a mobile device from the home network is provided that prevents full use of the device if it is lost or stolen. In addition, a method for transferring ownership information also helps determine the location of the device for retrieval.

Figure 1:
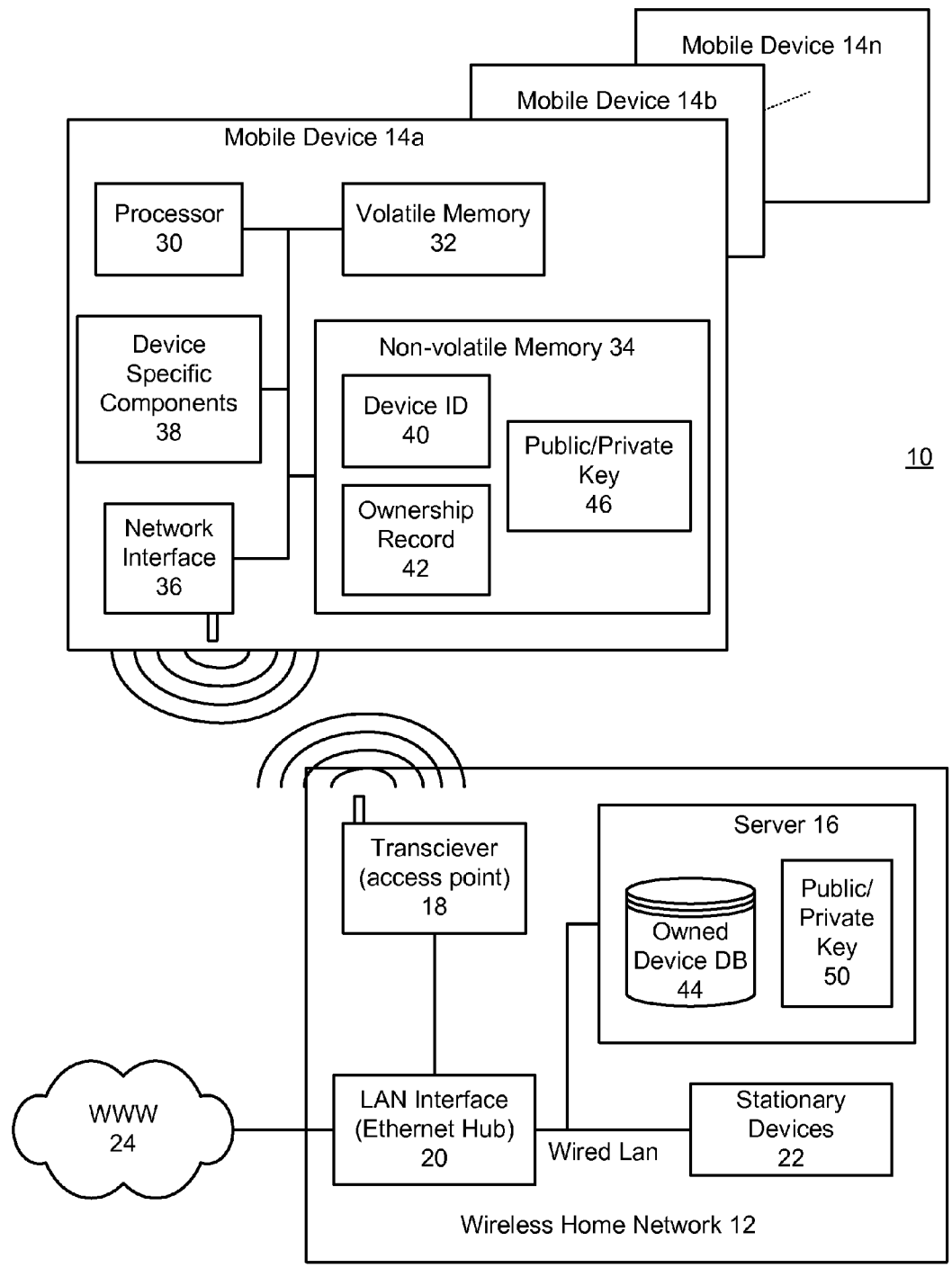
FIG. 1 is a block diagram illustrating a network configuration for use in accordance with the preferred embodiments of the present invention.

FIG. 1 is a block diagram illustrating a network configuration for use in accordance with the preferred embodiments of the present invention. In a preferred embodiment, the network configuration 10 comprises a wireless home network 12 capable of wireless communication with wireless mobile devices 14a-14n (collectively, mobile devices 14). The home network 12 includes one or more base stations, typically a server 16, coupled to one or more access points (transceivers) 18 through a LAN interface (e.g., Ethernet hub) 20. Other stationary devices 22 may also be coupled to the LAN interface 20 over a wired LAN, such as a printer, fax machine, music jukebox, and the like. The LAN interface 20 provides all the devices within the home network access to the Internet 24. Each mobile device 14 includes a CPU or DSP 30, volatile and non-volatile memory 32 and 34, a network interface 36 that enables wireless communication, and device specific components 38 for carrying out the intended function of the device 14.

In a preferred embodiment, the non-volatile memory 34 is a non-removable memory that is extremely difficult, if not impossible, to extract from the unit. In the preferred embodiment, the non-volatile memory 34 may reside on a system core ASIC, where the ASIC can be a controlled device (available only via warranty service) not readily available on the market or easily replicated. In addition, both the mobile device 14 and the network 12 are provided at appropriate points with respective private/public key pairs 46 and 50 and/or secret keys as part of the process of establishing a secure connection, for encrypting some, if not all, of the transmissions between the device 14 and the network 12. The method for establishing a secure connection between devices is well known and will not be described herein.

The first aspect of the present invention eliminates the need for passwords, ID's or security keys to be entered into the mobile device to establish a connection. This aspect of the present invention also alleviates the need for users to continually perform manual steps to enable communication between the mobile devices 14 and the home network 12 each time one of the mobile devices 14 comes within communication range of the network 12. According to the first aspect of the present invention, the network server 16 establishes a home relationship with a new device 14 if desired both by the local network administrator and the new device owner. The relationship established between the network 12 and the wireless device 14 is the identification of the network 12 or network server 16 as "home" from the point of view of the wireless device 14; and is the identification of an "owned device" from the point of view of the network server 16. That is, owned by the server 16 as an extension component of itself, in the same way that Microsoft Windows™ recognizes attached plug & play devices.

This special "home" relationship must be established with authorization from both the device owner and the network administrator/owner. It would be undesirable to automatically establish such a relationship via underlying wireless protocols because a person's device could be commandeered by any network that the user happens to pass by. However, according to the present invention, the network server 16 distinguishes between a new device 14a—one not "owned" by the network 12, and an owned device 14b—one in which ownership has already been established.

The focus of the first aspect of the present invention is on establishing automatic access of the device 14a to the network 12 and vise versa after a persistent relationship has been established, while the focus of the second aspect of the present invention is transferring ownership information to the device from the network to prevent use of the device on foreign networks by non-owners.

According to the second aspect of the present invention, the home relationship is established between the device 14 and the network 12 by the network 12 securely transmitting an ownership record 42 to the device 14, and by the device 14 securely transmitting its device identification (ID) 40 to the network 12. The ownership record 42 includes the necessary information for the device 14 to automatically recognize the "home" network 12, and the owner. Using these two pieces of information, the network 12 and the device 14 automatically recognize one another. In the preferred embodiment, a secure connection is used to establish and to revoke network ownership of the device 14.

When the ownership transaction is complete, there is a device 14 record held by the network 12, and an ownership record is held by the device 14. The device 14 record can be re-created at any time by the device 14 from internal resources, in order to transmit to the network 12 for authentication. Likewise, the ownership record can be re-created at any time by the network 12 from internal resources, in order to transmit to the device 14 for authentication. The two-sided authentication process—exchange of both ownership and device ID information for verification in a secure manner—is required to establish the owned or "home" connection between the device 14 and network 12.

Once "owned", ownership of the device 14 cannot be transferred to a third party until the network 12 "disowns' the device 14. In order to securely disown the device 14, a release command securely transmitted from the network 12 must be received by the device 14. In the preferred embodiment, the device 14 user must also manually authorize the release command via some form of interaction with the device 14. Thus, a secure ownership acquisition process and secure transfer of ownership is provided.

In operation, the device 14 is shipped from the factory with the ownership record 42 stored in the non-volatile memory 34. This ownership record 42 is initialized by the manufacturer in some way as to indicate that the device 14 is not yet owned. In an alternative embodiment, the record can show ownership by the manufacturer. In this case, the ownership record may be updated as it travels through various channels to an end user, such as a distributor and retail store. If ownership records 42 were updated in this manner, some form of automated update would be required to reduce cost. This is an unlikely prospect, because it requires that the device 14 be powered up. Since most devices 14 are shipped packed carefully in boxes with batteries separated from the device 14, the most likely approach is to ship the product such that the ownership record indicates the device 14 is un-owned, and rely on other methods, such as bar codes or embedded chips to track inventory.

When the device 14 is transferred to the end user, typically at a point of sale, the device 14 ownership record 42 indicates an disowned state, either set by the factory (preferred embodiment), or set by the seller. At the point of sale, end user owner information could be transferred into the device 14. This action may be facilitated at the point of sale by the seller and by the end user by transferring his ownership information from another mobile device 14 on his person, such as a cell phone or PDA. In this way, the ownership transaction is simplified and therefore feasible.

In the preferred embodiment, the ownership record is not transferred at point of sale, for security reasons that will be described later. Practical reasons include the requirement of the user to open the box, place the batteries in the device 14, and power it up. This also requires that the batteries contain sufficient charge to operate the unit. For these reasons, this is not a practical step.

In the preferred embodiment, the ownership record 42 is transferred to the device 14 by a network 12 owned or controlled by the device 14 owner. The preferred embodiment is for this ownership transaction to occur when the end-user brings the device 14 home, unpacks it, charges its batteries, powers it up, and connects it (wirelessly or via a network 12 interface cable) to the "home" network 12.

Once the server 16 detects the presence of a device 14a on the network 12, it is assumed to be a visitor, unless its device ID 40 is recognized through a pre-established home relationship. One of the ways of dealing with an unrecognized, and disowned, device 14a is to automatically notify the network administrator/owner, and request that they select from a list what kind of relationship is desired between the device and the network 12. Once the "home" relationship is established, the device 14b as accepted as an extension of the network 12, with full or specified access.

If the network owner selects the new device relationship as a "home" relationship, this decision must also be accepted by the user of the device 14a, which is presumed to be the owner. Preferably, this notification occurs via some form of interaction with the device 14a itself. Therefore, once the network administrator defines the relationship he or she is willing to grant the device 14a, the device owner is notified and requested to authorize establishment of the relationship. In the case where both network 12 and device owners are one in the same (e.g., a user buys a camera phone to function with the home network) the transaction proceeds. In the case that the two owners are different, both must agree before the transaction proceeds. This prevents a network operator from "snagging" a home relationship with a device that happen to enter their network area, without the permission of the owner of the device 14a.

If the device owner accepts the relationship, the specified relationship is established, and the device 14 is connected to the network 12. Thereafter, when the presence of the device 14 is subsequently detected by the network 12, the device 14 will be automatically recognized by the network 12 and allowed access with no additional configuration required by the user for operation. In addition, the device recognizes the network as home, thus preventing a foreign network from accessing data within the device that would typically be allowed from the home network.

This network configuration 10 could be implemented in a home (home network), a corporation, a retail store, or in some other type of business (corporate or government network).

The present invention will be described in terms of a preferred embodiment of a home network, but the features apply equally to business and/or government networks. In the case of a home network 12, the network administrator is typically the owner of the network, and if the same person purchased the new wireless device 14a, then the network administrator and the device user is one in the same.

Figure 2A:
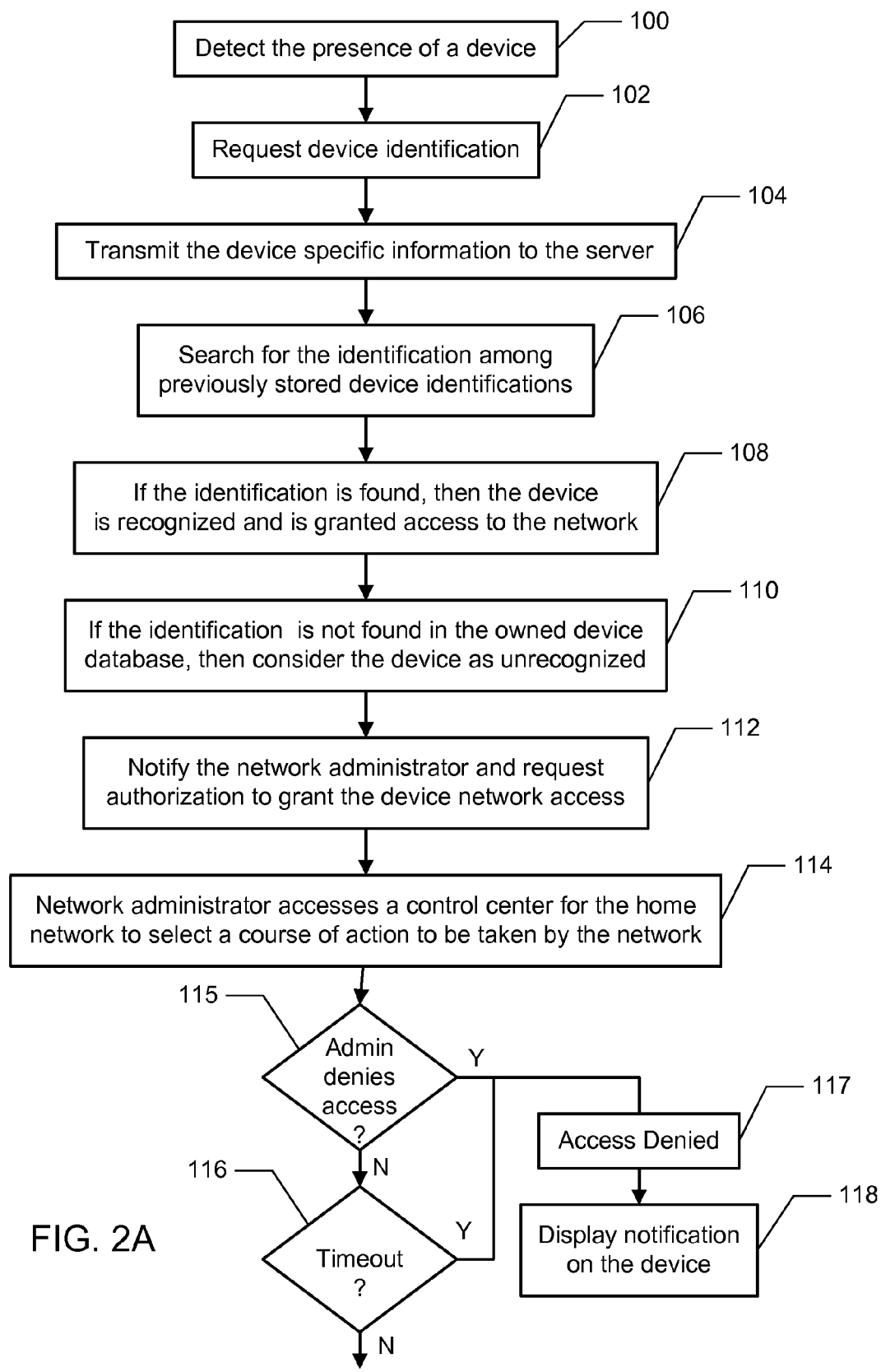
FIGS. 2A-2C are flow diagrams illustrating the process for establishing a persistent home relationship between the mobile device and the server and for negotiating ownership transfer.
Figure 2B:
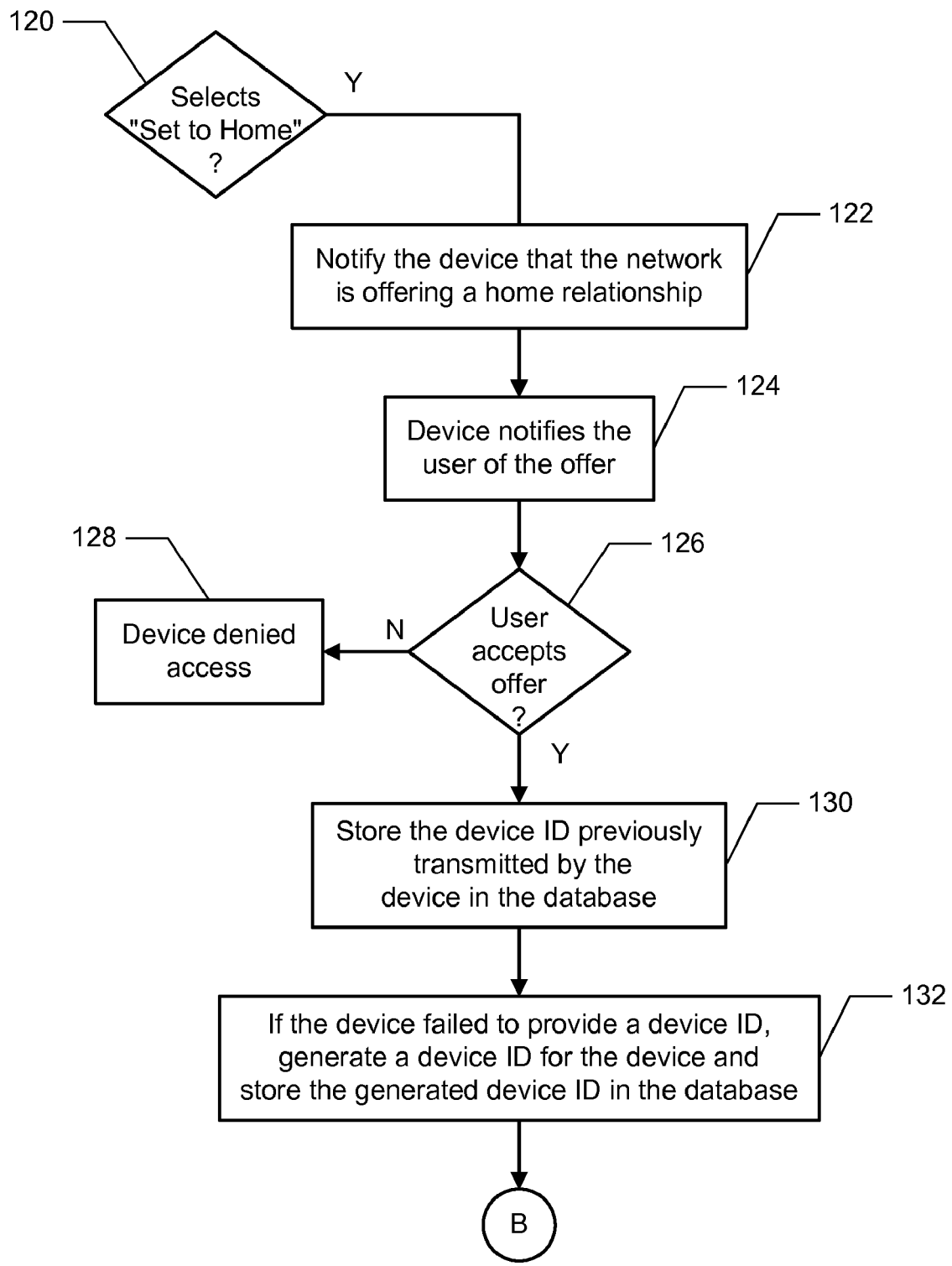
Figure 2C:
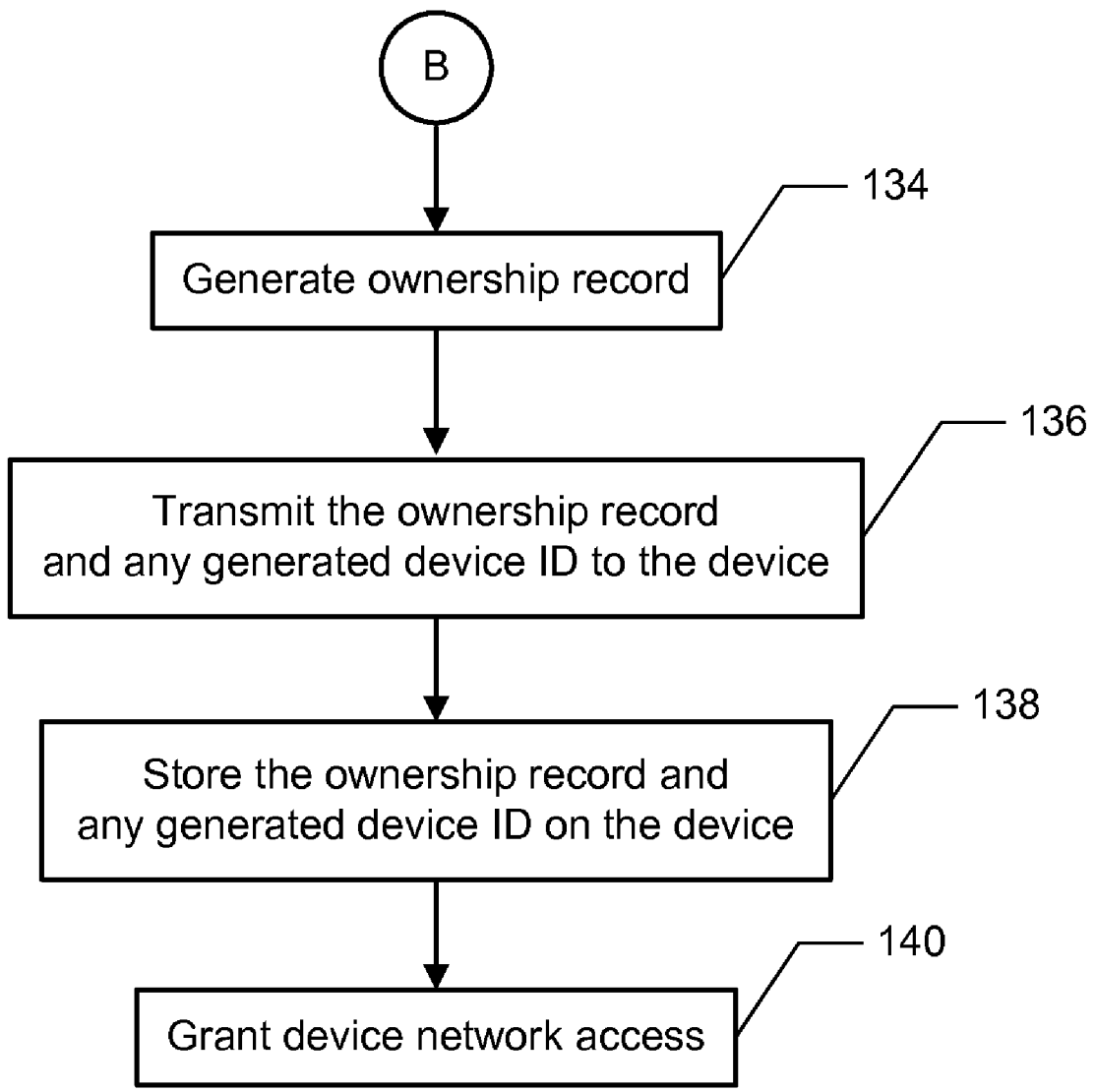

FIGS. 2A-2C are flow diagrams illustrating the process for establishing a persistent home relationship between the mobile device 14 and the server 16 and for negotiating ownership transfer in accordance with a preferred embodiment of the present invention. The process begins when the server 16 detects the presence of a device 14 within the active area of the local network 12 (step 100). In a preferred embodiment, the server 16 discovers the device 14 when a standard wireless network protocol discovery process establishes a restricted connection.

Once the server 16 detects the presence of the device 14, the server 16 attempts to recognize the device 14 by requesting information from the device 14, device identification 40 (step 102). In a preferred embodiment, the device identification 40 is information by which the server 16 can uniquely identify the device 14, such as a device ID, or serial number, for example. Referring again to FIG. 1, the device ID 40 is preferably stored internally in the device 14 in non-removable non-volatile memory 34.

Referring again to FIG. 2A, in response to receiving the request, the device 14 transmits the device specific information (if available) to the server 16 (step 104). In the preferred embodiment, the request for, and delivery of the device ID is over a secure connection initially established between the network 12 and device 14. In addition, the device ID may be transmitted in an encrypted message that changes over time so that they message changes. Randomizing the message in this manner ensures that a hacker cannot simply "sniff" encrypted value and reproduce it to fake an authorized device. Once the server 16 receives the device identification 40, the server 16 searches for the identification 40 among previously stored device identifications (step 106). In a preferred embodiment, the stored device identifications are kept in an "owned device" database 44, although a simple table or list could also be used. If the identification 40 is found, then the device 14 is recognized by the server 16 (step 108), and is granted access to the network 12 commiserate with stored preferences.

If the identification 40 is either not received or is not found in the owned device database 44, then the device 14a is unrecognized by the server 16 (step 110). The server 16 then notifies the network administrator using a method specified set in network preferences and requests authorization from the network administrator/owner to grant the device 14a access to the network 12 (step 112).

The owner can be notified by the home network 12 via one or more of the devices 22 attached to the network 12, such as an HDTV system, a high fidelity sound system, PC's located at various places inside the home or office, a pager or cell phone, or by special devices attached to the network 12 for this exclusive purpose. The notification may be through any audible or visual signal, such as a bell, and audio file being played over a sound system, a blinking light, or some other form of attention-getting signal. An electronic notification may be sent to a mobile device owned by the administrator, such as placing a call to the owner cell phone (text message or synthetic/recorded voice), or sending a message to the owner's pager, PDA, or messaging device. Of course, any combination of the above may also be used.

The network administrator/owner, recognizing the signal, would then access a control center for the home network 12 to select a course of action to be taken by the network 12 in regard to the device 14a (step 114). In a preferred embodiment, the control center automatically displays a list of different courses of actions. Alternatively, the owner could activate such a menu by interacting with the user interface of the control center. Note that the control center can also be a mobile device, such as a cell phone or wireless PDA carried by the owner. This allows the network owner to operate from his current location.

The actions displayed to the user may include: defining a known relationship between the device 14a and the network 12 that continues until revoked; denying access; allowing limited access; and allowing full access. In a preferred embodiment, the known relationship, which is persistent until revoked, is the "home" relationship. Other relationships are also possible, such as a persistent or temporary "guest" relationship. The owner would then select the desired relationship between the network and the new device.

If the administrator denies access (step 115) or fails to intervene with a preset time (step 116), the unrecognized device 14a is denied access to the network 12 (step 117). Devices that are not currently recognized would display a corresponding notification to their users (step 118), or would operate as if no network existed.

Alternative embodiments include the following: if there is no network owner intervention, an unrecognized device may be allowed guest access, depending on preset owner preferences. Temporary guest access can be set, according to preferences set by the owner, to allow some limited use of the local network by the guest, such as connection to the world wide web. This connection can be restricted in a number of ways, such as time, bandwidth, or transfer limits. Guest access of this type would allow roving devices to be more useful to their owners, in that limited connection to the world wide web whenever they were within the area of a local wireless network would be automatically provided.

One of the possible selections offered to the network administrator would be to set up a persistent guest access for the device. In this case, the device would be registered as a guest device in database 44. This would eliminate future notifications when this guest was detected. In this case, no interaction is required between the device and its owner.

In a typical network environment such as a home, the notification process described above for the network administrator would be appropriate. However, in high traffic locations, such as a business, a retail store, or an apartment on a busy street, the constant notifications of momentary connections with passer-bys would be troublesome. In this case, notification can be suppressed—i.e., no audible or visual indication given. However, the process would still be available to establish a home relationship. In this case, the owner would simply access the network control center, select the appropriate menu, and (if more than one guest device was active) select the appropriate device with which to establish a home connection. The device notification and interaction described below would be the same.

Referring now to FIG. 2B, assuming that the new device 14a is a recent purchase, then the owner will select the menu option that sets the network as "home" for the device (step 120). The server 16 notifies the device 14a that the network 12 is offering a home relationship to the device 14a (step 122). In response to receiving the notification from the server 16 of an offered relationship, the device 14a notifies the device user to authorize the relationship (step 124). The device user may either accept or reject the offer (step 126). The home relationship, if accepted, not only allows access to the network by the device, but, as described below, access to the device by the network. Thus, accepting home relationship means allowing access to the device, which requires user permission. If the device user rejects the offer, the device 14a is denied access to the network 12 and the process ends (step 128). Alternatively, guest access is provided in this case, depending on preferences set by the network administrator.

If the device owner accepts the offer, then the server 16 begins the establishment of the relationship by storing the device ID 44 that was previously transmitted by the device 14 in the owned device database 44 (step 130) for future automatic recognition of the device 14 and network access grant. If the device 14 failed to provide a device ID 44, then the network 12 generates a device ID 40 for the device 14 and stores the generated device ID 40 in the database 44 (step 132).

Referring now to FIG. 2C, the server 16 also generates the ownership record containing information that identifies both the home network 12 and the owner of the network (step 134), such as name, address, and so on. In a preferred embodiment, the server 16 then transmits the ownership record 50 and any generated device ID 40 over a secure connection to the device 14 (step 136). In a preferred embodiment, the ownership record 50 and any generated device ID 40 are transmitted as an encrypted message that includes a value that changes over time so that the message sent to the mobile device 14 is randomized.

Once received, the device 14 parses the message and stores the ownership record 42 and generated device ID 40 to facilitate device recognition of the home network (step 138). The device 14 is then granted network access as a home device, based on preference settings and device types (step 140).

When the "home" owned transaction is complete, there is a device ID 40 record held by the network 12, and an ownership record 42 held by the device 14, to facilitate recognition between the network and the device on subsequent detections. The device ID 40 and ownership record 42 can be in many forms, including serial numbers, user names and other information. The only requirement is that the information provides unique identification of the device 14 and network/owner, respectively.

According to present invention, the "home" relationship where the device 14 and network 12 share the same owner, allows automatic functions to occur, such as data sharing. In the case of a digital camera, for example, this could mean the automatic downloading of new images discovered on the storage device in the camera whenever the camera shows up on the network. Likewise, in a business setting, recognized employee owners can be granted specific access and services depending on their position within the organization.

In the preferred embodiment, when an owned device is detected, the network will access a list of known devices, and determine access automatically, either from preference "rules" or specific preferences set for each recognized device. If the owner is recognized as the same owner as the network, i.e., if the network owns the device, then the access granted may include automatic services provided by the network to the device. Selected automatic services may also be granted to other known devices.

The purpose of storing the ownership record 42 within the device is to allow the device 14 to also recognize its home network 12. This is important from a security point of view, because the home relationship may include not only access to the network 12, but network access to the device 14. For example, if the device 14 is a cell phone, and a new phone number has been received by the network from a friend, this information can automatically update the phone list in the cell phone. Or, if the device 14 is a digital camera, the network 12 may interrogate the camera for new images, and, if found, automatically download them, and even deleting them in the camera, based on preference settings. This would free up camera memory to take additional pictures without the user having to specifically download and store the images, and then erase them manually. Therefore, it is critical that the device recognize the home network as well as the home network recognize the device. It would be undesirable to grant any network that claims it is the home network access to the device: some form of certification or validation is required.

In a further embodiment of the present invention, the ownership record 42 may be transmitted to the device 14 even while the owner is traveling and away from the home network 12. In this embodiment, the owner uses an existing device that belongs to the home network 12 to transfer a copy of the ownership record 42 to the new device 14. The ownership record 14 can indicate that ownership is temporary, and when the user returns home with the new device 14, the home network 12 performs steps above to make the ownership transfer persistent.

Once the network 12 recognizes the device 14, the ownership record is retrieved or created by the network 12, and transmitted securely to the device 14. An alternate embodiment is that a request is sent by the device 14 for this information. In either case, the information is compared to the stored ownership record in the device 14. If the comparison succeeds, then access to the device 14 resources is granted to the network 12.

When access is granted to the network 12 or to the device 14, there is no specific requirement to notify the network 12 or device 14 that such access has been granted. In an alternate embodiment, access right granting can be signaled to the device 14 and network 12 by transmitting an acknowledgement (ACK) to the provided information, or a negative acknowledgement (NAK) if the provided information is not verified. Thus, when the network 12 receives and verifies the device 14 ID, it responds with an ACK, and if no verification is made, a NAK. Likewise, when the device 14 receives the ownership record, if it verifies, the device 14 responds with an ACK, and if it does not verify, the device 14 responds with a NAK. In this way, both network 12 and device 14 are aware of the access status granted, and preset operations can commence, if they have been set up by the user, such as automatically downloading images from a digital camera, for example.

When the ownership transaction is complete, the ownership record 42 is stored in the device 14, and the device ID 40 is stored in the network 12. In a preferred environment, public/private encryption is used to establish ownership, identify an owned device 14 to the network 12 and to revoke ownership status. Although the present invention is described using two different sets of public/private keys 46 and 50, one set of keys may also be used.

Figure 3:
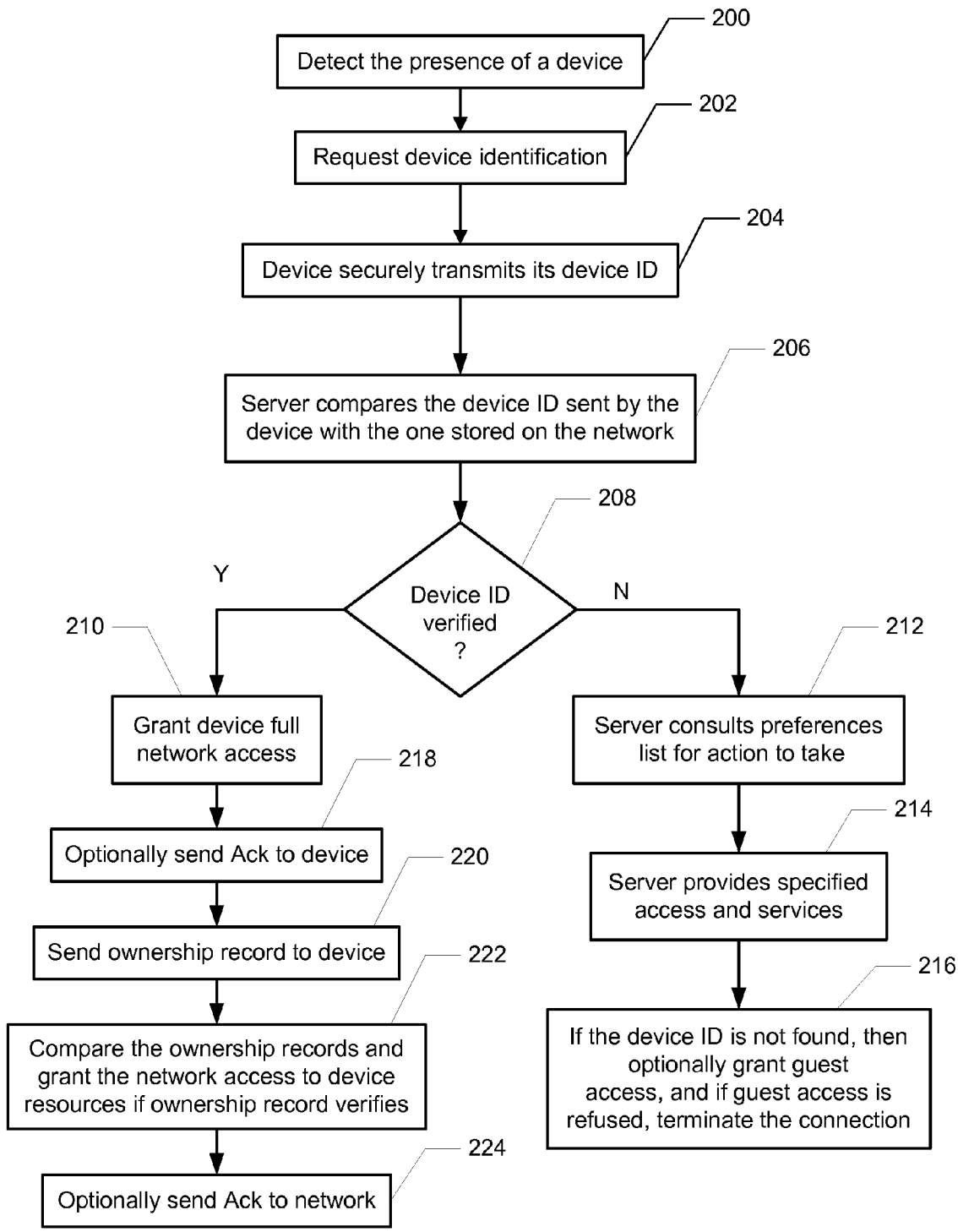
FIG. 3 is a flow diagram illustrating the network process for identifying the mobile device once ownership of the device has been established.

FIG. 3 is a flow diagram illustrating the network process for identifying the mobile device 14 once ownership of the device 14 has been established. The process begins when the network server 16 detects the presence of a device 14 within the active area of the local network 12 using a network protocol discovery process and establishes a restricted connection (step 200). In the preferred embodiment, this is a secure connection. Once the server 16 detects the presence of the device 14, the server 16 attempts to recognize the device 14 by requesting information from the device 14 (step 202). In response, the device 14 transmits the device ID 40 (preferably as a message having a varying value) (step 204). The server 16 receives the device ID 40 and compares the device ID record sent by the device with the device ID record stored on the network 12 (step 206). If the device ID record is verified (step 208), then the device 14 is recognized and granted full network access (step 210). Alternatively, the type of access for the particular device 14 may be specified from a device access control table.

If the device ID record is not verified in step 208, then the device 14 is not owned by the network 12 and the server 16 consults a preference list for one action to take (step 212). Using the device ID 40, the server 16 may provide access and services as specified in the device access control table (214). If the device ID 42 is not found, then guest access may be granted, and if guest access is refused, the connection is terminated (216).

As stated above, an acknowledgement or negative acknowledgement response may be sent to the device 14 after verifying the device ID (step 218). A second cycle of validation occurs when the network, after having successfully identified the device 14, sends to the device 14 the ownership record 42 for validation (step 220). In the preferred embodiment, this is sent over a secure communications channel. The device compares the ownership information sent by the network with the one stored on the device and grants access to its resources by the network 12 if the ownership record verifies (step 222). As stated above, an acknowledgement or negative acknowledgement response may be sent to the network after comparing the ownership information with the record stored in the device (step 224).

Once the device 14 is owned, it cannot be owned by another person until it is returned to an "disowned" status. This process requires both the device user and the network administrator/owner to intervene in order for such a transaction to occur. For higher security, the disowning process requires the home network 12 to release the device 14, with network administrator interaction. This prevents a stolen device from being transferred to a new owner without the permission of the true owner.

In an alternative embodiment, a public/private key pair is used to exchange the product ID record and the ownership record between the network and device. This public/private key can be established during the initial ownership transfer process by the home network creating a unique key pair, and sharing one of the keys with the device. In this way, a secure transmission can take place without the additional process of establishing a normal secure connection—a much more complex process. In this alternate embodiment, a value within the data must change for each cycle to ensure security. This could be as simple as a counter sent within the request, and the same value or related value returned with the acknowledgement. This prevents a device being fooled by accepting a fixed response every time.

Figure 4:
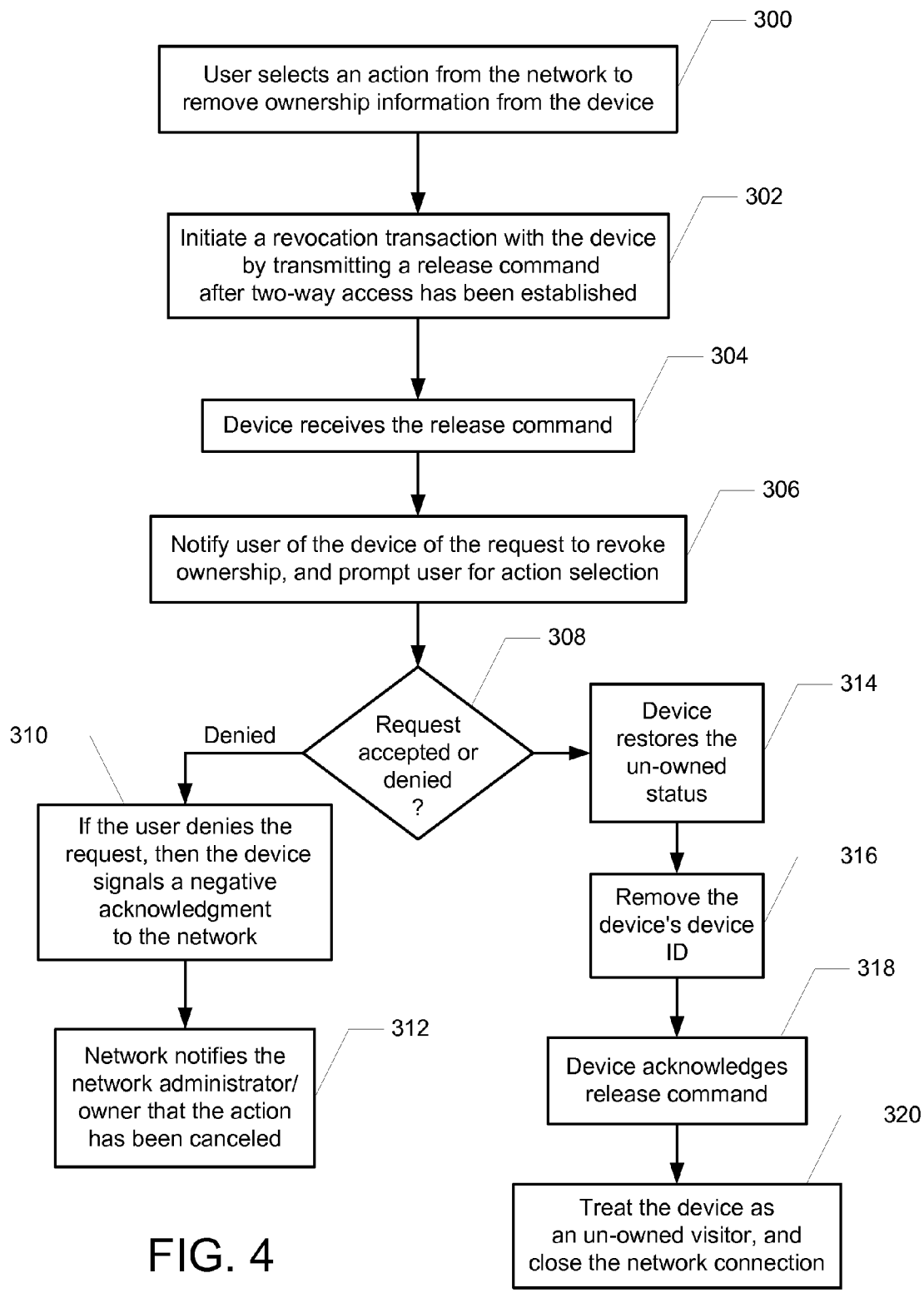
FIG. 4 is a flow diagram illustrating the process for revoking ownership of the device.

FIG. 4 is a flow diagram illustrating the process for revoking ownership of the device. The process begins after the device is recognized by the network as described with respect to steps 200-210 of FIG. 3. The user selects an action from the network 12 to remove ownership information from the device 14 (step 300). The server 16 initiates the ownership revoking process by initiating a revocation transaction with the device 14 by sending a release command using a secure after access both ways has been established as described above. The device 14 receives the release command (step 304) and notifies the user of the device of the request to revoke ownership, and prompts user for action selection (step 306). The user either accepts or denies the request (step 308). If the user denies the request, then the device 14 signals a negative acknowledgment to the network 12 (step 310), and the network notifies the network administrator/owner that the action has been canceled (step 312).

If the device user accepts that the action, then the device 14 restores the disowned status within the non-volatile memory 34 (step 314). This may be done by overwriting the ownership record 42. The device 14 then acknowledges the release command to complete the transaction (step 316). In response, network 12 removes the device's device ID 40 from the owned device database 44 (step 318). Thereafter, the network 12 treats the device 14 as an disowned visitor, and closes the network connection (step 320).

In a further embodiment of the second aspect of the present invention, when the owned device 14 is connected to a foreign network, a number of things can happen. If the foreign network is connected to the internet, a transaction can take place between the device 14 and its "home" network. This transaction may be as simple as a "request/acknowledge" cycle including the device ID. In the preferred embodiment, this transaction occurs within a secure connection. In an alternative embodiment, a public/private key pair is used for this transaction. This public/private key can be established during the initial ownership transfer process by the home network creating a unique key pair, and sharing one of the keys with the device. In this way, a secure transmission can take place without the additional process of establishing a normal secure connection—a much more complex process. In this alternate embodiment, a value within the encrypted data must change for each cycle to ensure security. This could be as simple as a counter sent within the request, and the same value or related value returned with the acknowledgement. This prevents a device being fooled by accepting a fixed response every time.

If the device 14 has been stolen, the home network can return a negative acknowledgement, causing the device 14 to cease functioning, and remain in that state until direct communication is re-established with the home network. The network address of the device 14 contained within the request packet can be used to assist in location of the device 14. A service can be provided for this, where a central server will take the request packet provided by the home server, and use it to narrow the location of the device 14, and provide this information automatically to law enforcement officials. In this way, a device 14 can be rendered inoperative when stolen, and assist in the recovery process.

An alternate embodiment of this invention employs a wired connection between the device and the network. While wired devices are often set at fixed locations, mobile devices may also be connected via a docking station (wired or wireless), or by simply plugging a cable from the network or a network computer into them. The same form of interaction described for wireless devices applies to these wired cases as well.

A method and system for transferring device ownership in a wireless network has been disclosed. The present invention has been described in accordance with the embodiments shown, and one of ordinary skill in the art will readily recognize that there could be variations to the embodiments, and any variations would be within the spirit and scope of the present invention. Accordingly, many modifications may be made by one of ordinary skill in the art without departing from the spirit and scope of the appended claims.

I claim:

1. A method for device ownership transfer, comprising:
receiving an ownership record by a mobile device from a network, thereby establishing a home network for the mobile device;
sending, when the mobile device is connected to a foreign network, a request message via the foreign network to the home network as a first portion of a transaction;
receiving, from the home network, a negative acknowledgment based on an indication that the mobile device is stolen or lost as a second portion of the transaction; and
ceasing a function of the mobile device in response to the negative acknowledgment.

2. The method of claim 1 further comprising: periodically altering a value of the acknowledge message.

3. The method of claim 1 further comprising: encrypting the transaction using public/private key encryption.

4. The method of claim 1 further comprising: receiving access to the home network when the mobile device is detected by the home network.

5. The method of claim 1 further comprising: using a network address of the mobile device to assist in determining a location of the mobile device.

6. The method of claim 1 further comprising: storing an initial ownership record that indicates the mobile device is not owned.

7. The method of claim 1 further comprising: receiving a disowned message after the mobile device has been owned through the transfer of the ownership record, wherein the mobile device can be owned by another.

8. The method of claim 1 further comprising:
establishing direct communication with the home network; and
resuming the function of the mobile device in response to the direct communication with the home network.

* * * * *